United States Patent [19]

Isono

[11] Patent Number: 5,046,549
[45] Date of Patent: Sep. 10, 1991

[54] SEPARATE AIR-CONDITIONER
[75] Inventor: Kazuaki Isono, Shizuoka, Japan
[73] Assignee: Mitsubishi Denki K.K., Tokyo, Japan
[21] Appl. No.: 214,043
[22] Filed: Jun. 30, 1988
[30] Foreign Application Priority Data Jul. 2, 1987 [JP] Japan ................. 62-165738
Jul. 2, 1987 [JP] Japan ................. 62-165739
Oct. 2, 1987 [JP] Japan ................. 62-249231

[51] Int. Cl.⁵ .................. F29B 29/00; F25D 17/06; F24F 11/02; F24F 11/053
[52] U.S. Cl. ...................... 165/39; 165/40; 165/127; 62/186; 236/38; 236/49.3
[58] Field of Search .................. 165/40, 122, 127, 24, 165/39; 98/31.6; 62/186; 236/37, 38

[56] References Cited
U.S. PATENT DOCUMENTS 4,795,089 1/1989 Tezuka et al. ................. 236/49.3

FOREIGN PATENT DOCUMENTS

| 0112515 | 7/1984 | European Pat. Off. |
|---|---|---|
| 0085827 | 6/1980 | Japan ................. 165/122 |
| 0112949 | 9/1980 | Japan ................. 98/31.6 |
| 0121341 | 9/1980 | Japan ................. 165/127 |
| 0121342 | 9/1980 | Japan ................. 165/127 |
| 59-191842 | 10/1984 | Japan . |
| 0196526 | 10/1985 | Japan ................. 165/122 |
| 0161357 | 7/1986 | Japan ................. 165/127 |
| 697261 | 9/1953 | United Kingdom . |

Primary Examiner—John Ford
Attorney, Agent, or Firm—Kanesaka & Takeuchi

[57] ABSTRACT

A separate air conditioner includes a heat exchanger, an upper fan, a lower fan, the first air flow control for controlling the upper and lower fans in an initial heating period such that the ratio of an upper air flow from the upper fan to a total air flow from both the upper and lower fans decreases as the total air flow increases; and the second air flow control for controlling the upper and lower fans in a stable heating state such that the ratio increases as the total air flow increases. The first air flow control controls the upper and lower fans in a cooling operation such that the upper air flow is inversely proportional to the total air flow, while the second air flow control controls the upper and lower fans in a heating operation such that the upper air flow is proportional to the total air flow.

2 Claims, 13 Drawing Sheets

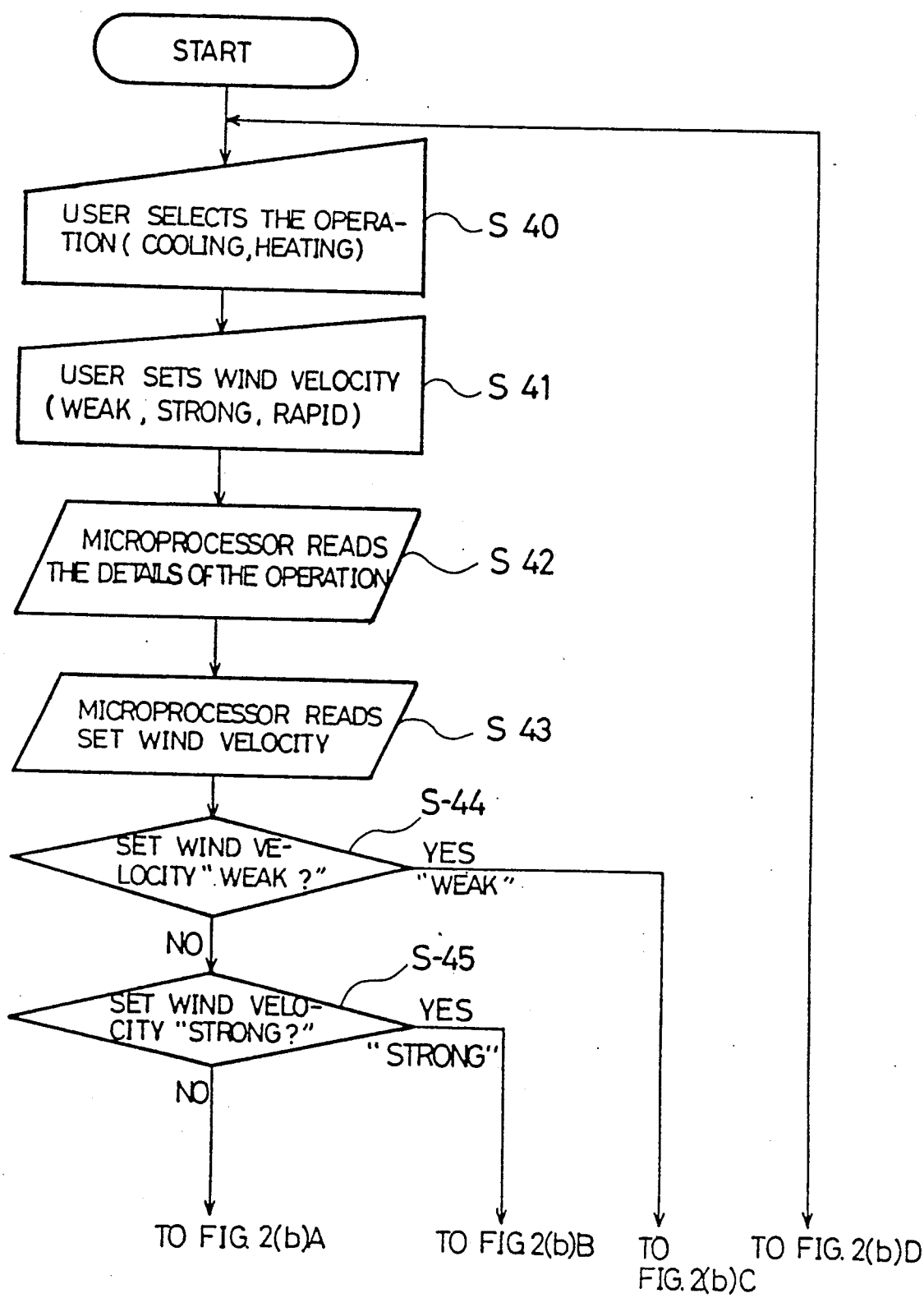

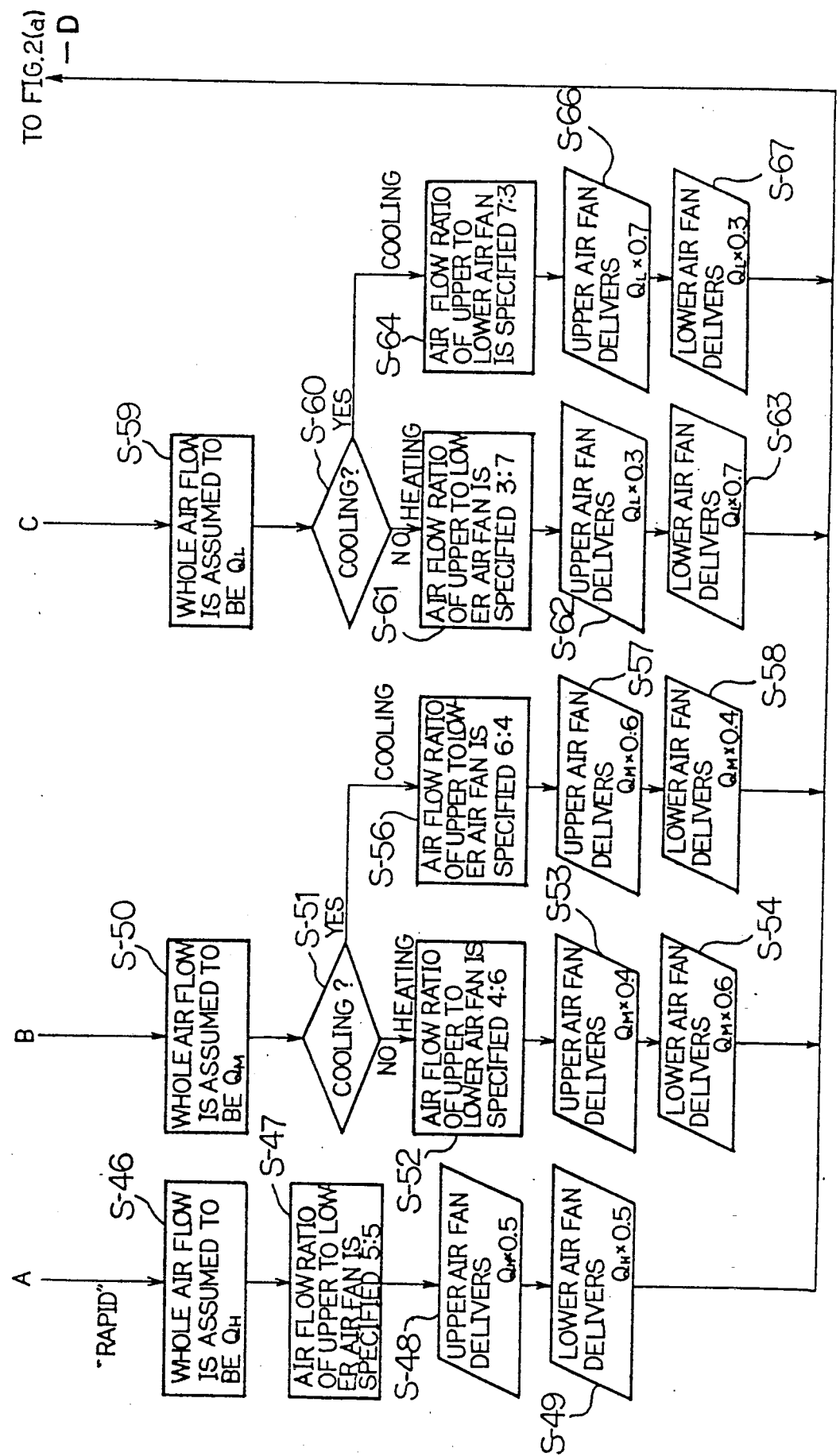

FIG. 11(a) PRIOR ART    FIG. 11(b) PRIOR ART
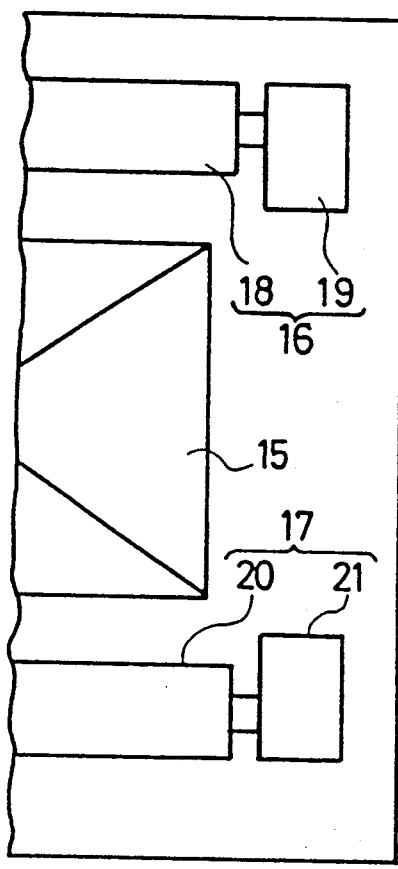
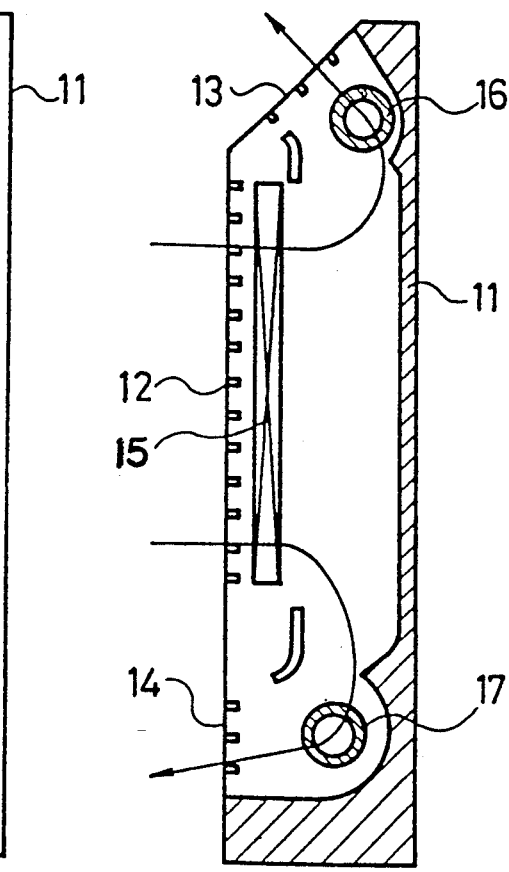
FIG. 12 PRIOR ART
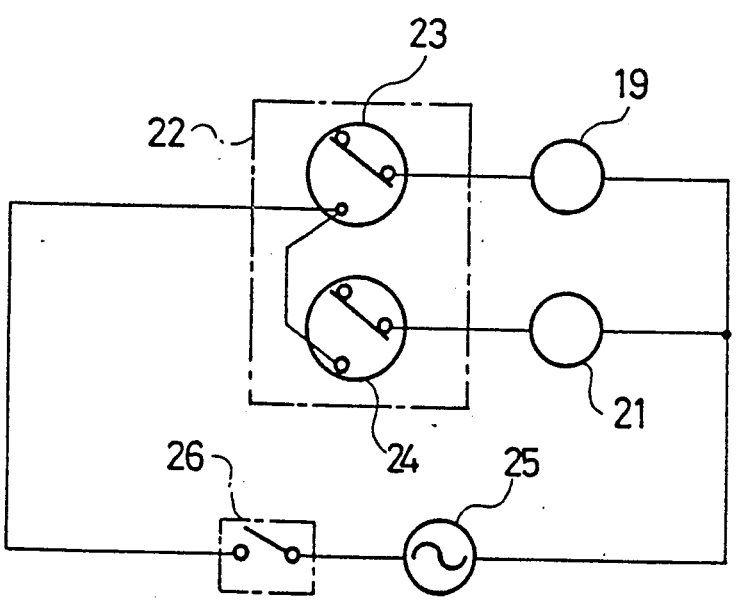

SEPARATE AIR-CONDITIONER

BACKGROUND OF THE INVENTION

1. Field of the Invention

The present invention relates to a separate air-conditioner for use in a room which includes a heat exchanger, an upper air fan for taking air from the room through the heat exchanger and blowing it out from the top of the room unit, and of a lower air fan for taking the air from the room through the heat exchanger and blowing it out from the bottom of the room unit.

2. Description of the Prior Art

FIGS. 11 and 12 illustrate respectively a room unit of a prior separate air conditioner. In particular, the former shows that of a floor type, while the latter shows a fan controller disclosed in Japanese Laid-Open Publication No. 55-112947. In the figures, a unit casing 11 includes an air inlet 12 for room air located substantially at the center of the front surface, an upper air plenum 13 for the room air at the upper portion of the front surface, and a lower air plenum 14 at the lower portion of the front surface. In the unit casing 11, a heat exchanger 15 is disposed oppositely to the air inlet 12, with a upper air fan 16 disposed oppositely to the upper air plenum 13 and a lower air fan 17 disposed oppositely to the lower air plenum. The upper fan 16 includes a fan wheel 18 and a fan motor 19 for driving the fan wheel 18, which is adapted to direct the room air from the air inlet 12 toward the heat exchanger 15, and blow the air out through the upper air plenum 13. The lower air fan 17 includes a fan wheel 20 and a fan motor 21 for driving the fan wheel 20, which is adapted to direct the room air from the air inlet 12 through the heat exchanger 15 and the lower air plenum into the room. A double thermostat operable at room temperature includes a thermostat 23 having a first working temperature and a thermostat 24 having a second working temperature. The thermostat 23 turns on/off the fan motor 19 of the upper fan 16, while the thermostat 24 turns on/off the fan motor 21 of the lower fan 17. An AC power source is connected to the fan motors 19, 21 via the double thermostat 22.

In operation, when the room temperature reaches the first working temperature, the thermostat 23 is operated to close its contact so that, the fan motor 19 starts to rotate, causing the upper fan 16 to direct the room air from the air inlet 12 through the heat exchanger 15 and the upper air plenum 13 into the room.

When the room temperature rises to the second working temperature, the thermostat 24 is operated to close its contact so that, the fan motor 21 starts to rotate, causing the lower fan 17 to direct the room air from the air inlet 12 through the heat exchanger 15 and the lower air plenum 14 into the room.

The conventional air conditioners, however, suffer from the following problems.

The conventional separate air conditioners are adapted, as described above, to start the upper fan when the room temperature reaches the first working temperature while the lower one when the room temperature reaches the second working temperature which is higher than the first one. Accordingly, 1) an uncomfortable draft occurs when the heating operation is started; 2) a proper temperature distribution is not obtained when the heating is stable and 3) it is too cold when the whole or entire air flow is reduced since the hot air is not directed to the lower foot area.

SUMMARY OF THE INVENTION

In view of the drawbacks with the conventional air conditioners, it is an object of the present invention to provide a separate air conditioner capable of supplying plenty of warm air in the foot area of a room when the whole air flow is reduced without causing an uncomfortable draft thereby assuring a comfortable living space with a proper temperature distribution for each operation setting of the conditioner.

To achieve the above objects, the present invention provides air flow control means for controlling air flows blown out from upper and lower air fans.

The air flow control means controls in cooling operation the upper and lower air fans such that an upper air flow from the upper air fan is inversely proportional to the whole air flow from the upper and lower air fans, while in heating operation such that the upper air flow is proportional to the whole air flow.

The air flow control means further controls upon starting the heating operation the upper and lower air fans so as to reduce the ratio of the upper air flow to the whole air flow as the whole air flow increases.

The air flow control means still further controls in stable heating operation the upper and lower air fans so as to reduce the ratio of the upper air flow to the whole air flow as the whole air flow decreases.

The separate air conditioner of the present invention further includes room temperature sensor means for sensing room temperature and heat exchanger temperature sensor means for sensing the temperature of a heat exchanger.

The room temperature sensor means controls through one air flow control means the upper and lower air fans such that the whole air flow from those upper and lower air fans is decreased when room temperature sensed by the room temperature sensor means exceeds a predetermined third temperature, and the upper air flow from the upper air fan is decreased with respect to the whole air flow, while increasing the whole air flow increases when the sensed room temperature is less than a predetermined fourth temperature which is lower than the third temperature, and further increasing the upper air flow with respect to the whole air flow.

The heat exchanger temperature sensor means controls through another air flow control means the upper and lower air fans such that the whole air flow is increased and the upper air flow is reduced with respect to the whole or total air flow when the heat exchanger temperature sensed by the heat exchanger temperature sensor means exceeds a predetermined first temperature, while the whole air flow decreases and increases the upper air flow with respect to the whole air flow when the sensed heat exchanger temperature is less than a second temperature which is lower than the first temperature.

The above and other objects, features, and advantages of the present invention will become more apparent from the following description when taken in conjunction with the accompanying drawings.

BRIEF DESCRIPTION OF THE DRAWINGS

FIG. 2a and 2b are is a flow chart showing the operation of the first embodiment;

FIG. 11a is a partial front view of a conventional air conditioner;

FIG. 11b is a cross section of the conventional air conditioner; and

FIG. 12 is a block diagram of a portion of the air fan controller of FIG. 11.

DETAILED DESCRIPTION OF THE PREFERRED EMBODIMENTS

Figure 1:
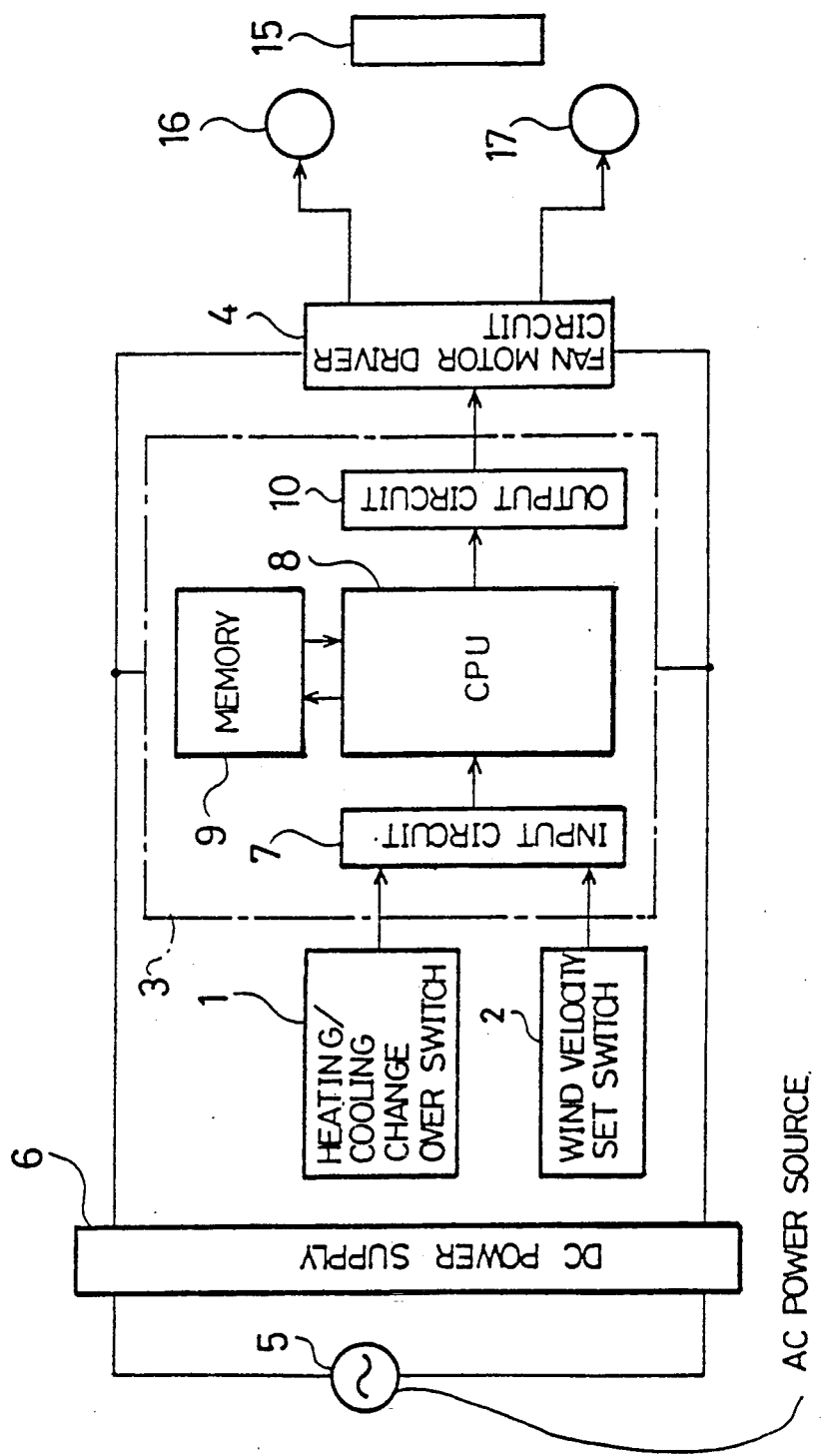
FIG. 1 is a block diagram showing the first embodiment of a separate air conditioner according to the present invention.
Figure 3:
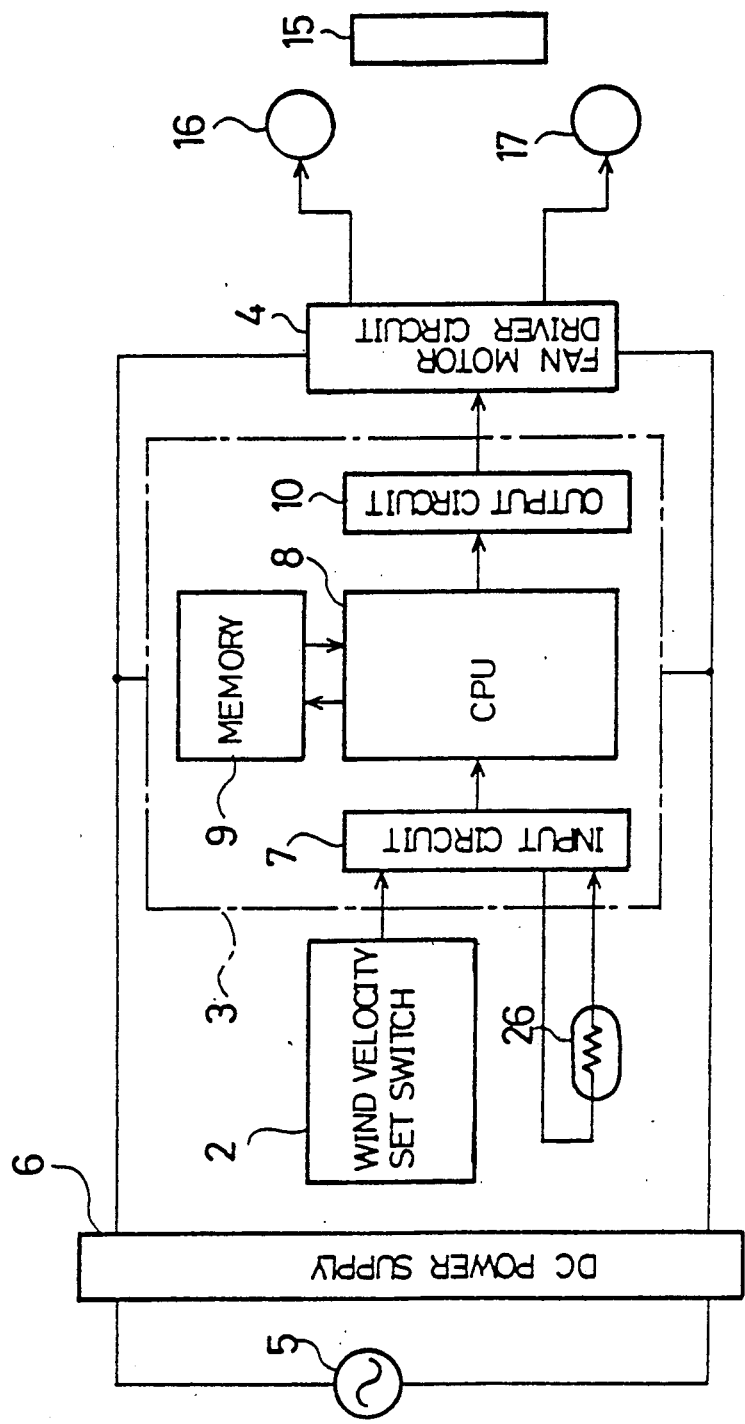
FIG. 3 is a block diagram of the second embodiment of a separate air conditioner of the present invention.
Figure 4:
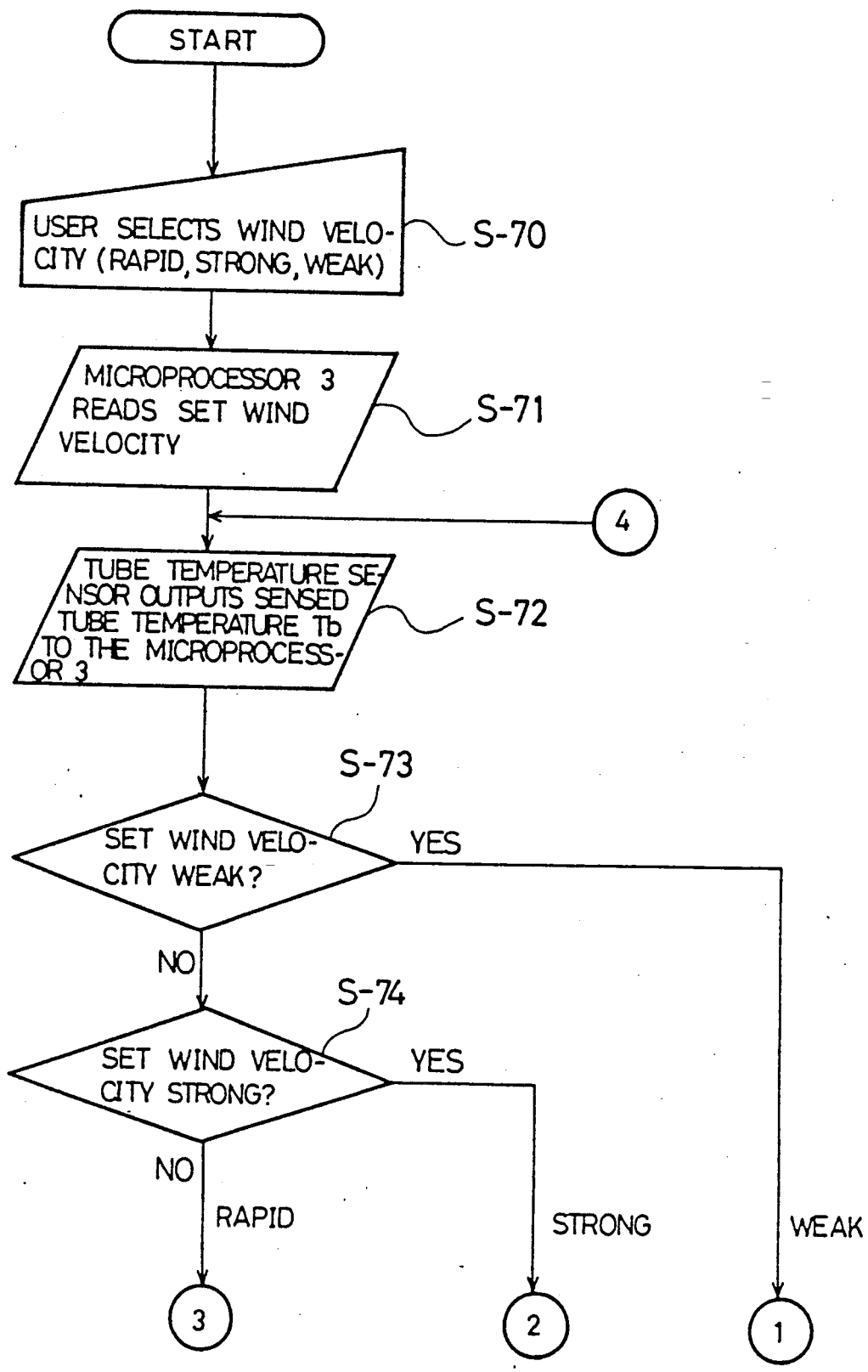
FIGS. 4 to 7 are flow charts showing the operation of the second embodiment.
Figure 5:
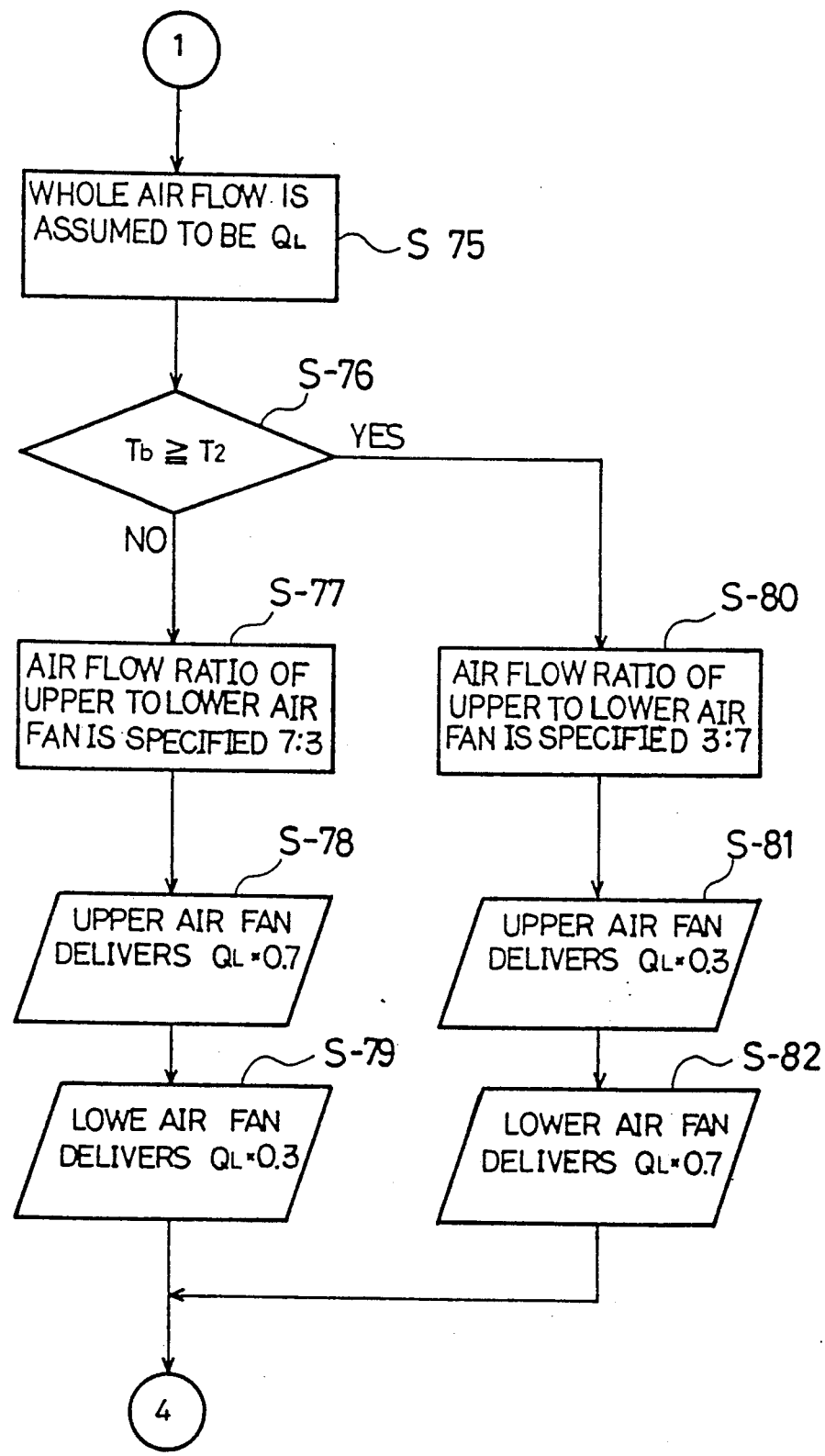
Figure 6:
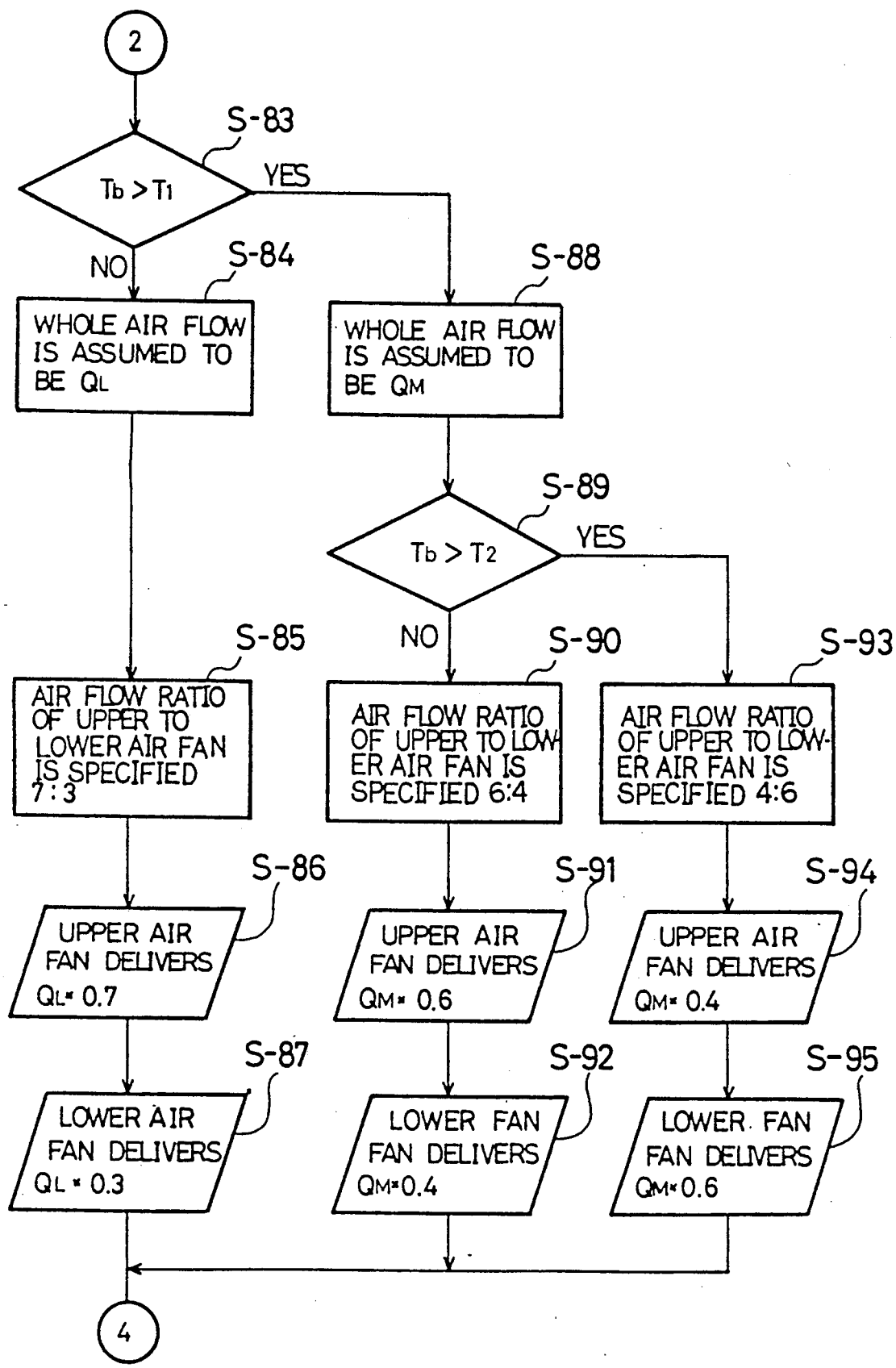
Figure 7:
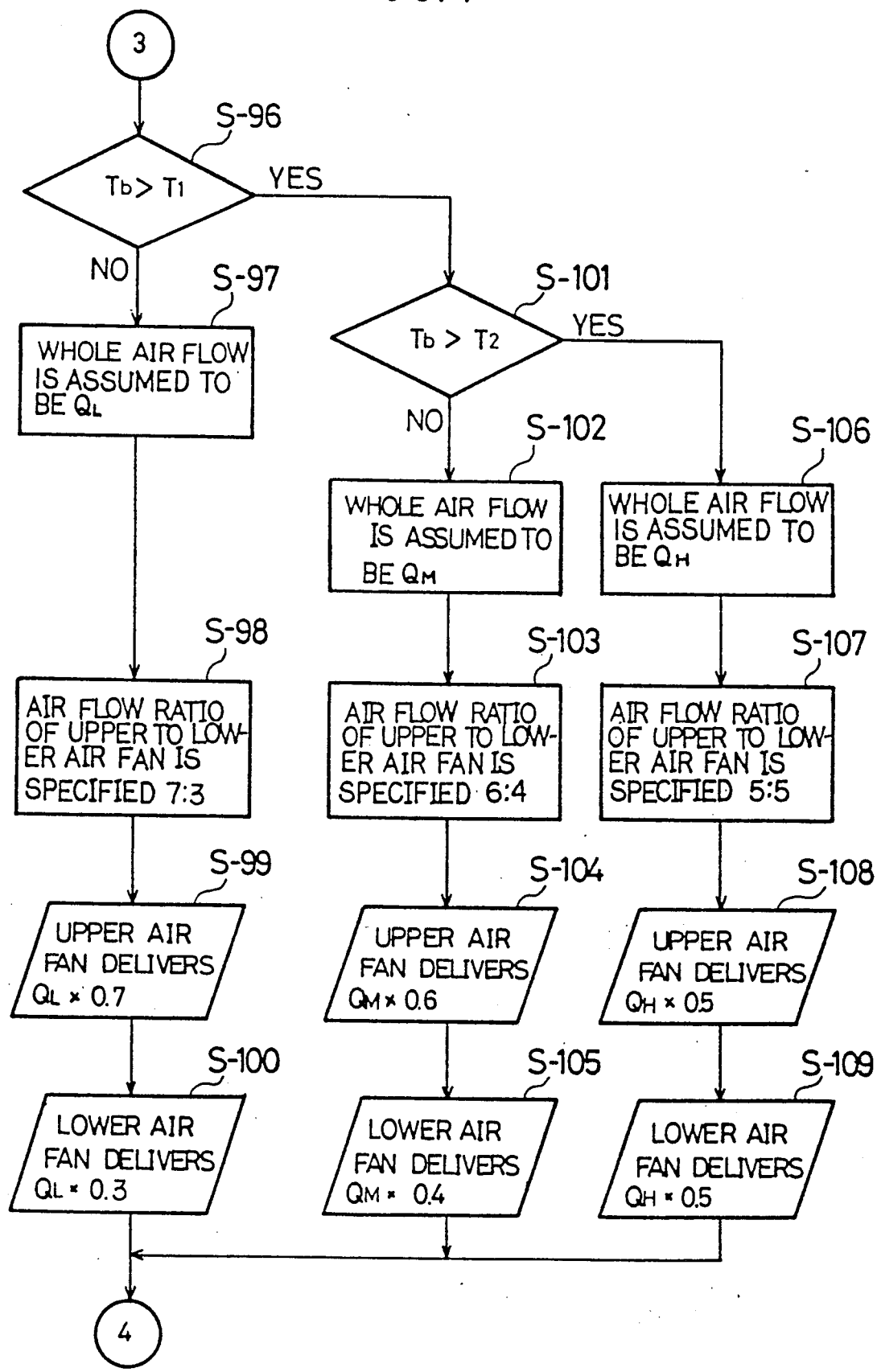

As shown in FIG. 1, a heating/cooling changeover switch 1 changes the operation to either the heating or cooling mode. A flow rate set switch 2 changes the air flows from the upper and lower air fans to one of "rapid", "strong", and "weak settings". A microprocessor 3, which acts as the first and second air flow control means, includes an input circuit 7 connected to the heating/cooling changeover switch 1 and the flow rate set switch 2 for receiving changeover signals therefrom, a CPU 8 for controlling the upper and lower air fans 16, 17, a memory 9 connected to the CPU 8 for storing control information for the upper and lower air fans 16, 17 and providing it to the CPU 8, and an output circuit 10 connected to the CPU 8 for delivering control signals. The microprocessor 3 controls the rotary speeds of the fan motors 19, 21 of the upper and lower air fans 16, 17 via a fan motor driver circuit 4 connected to the microprocessor 3. In detail, the microprocessor 3 controls the upper air fan 16 such that the upper air flow from the upper air fan 16 is inversely proportional to the whole air flow from the upper and lower air fans 16, 17 when the heating/cooling changeover switch 1 changes the operation over to the heating mode, while controlling it such that the upper air flow is proportional to the whole air flow when the heating/cooling changeover switch 1 changes the operation over to the cooling mode. The microprocessor 3 and the fan motor driver circuit 4 are supplied with a stabilized power from an AC power source 5 by a DC power supply 6 which rectifies and stabilizes AC power from the AC power source.

Here, operation of the first embodiment will be described with reference to the flow chart of FIG. 2.

First, in steps of S-40, S-41, a user selects the operation (cooling or heating) with the heating/cooling changeover switch 1, and further sets any of air flow or wind at the "weak", "strong", and "rapid" with the wind velocity set switch 2. Then, in steps S-42, S-43, the microprocessor 3 reads signals indicative of the selected operation and the set wind velocity.

(1) When the set wind velocity is "weak" in S-44:

In this case, the whole air flow Q is assumed to be $Q_L$ in S-59. When the heating operation is indicated in S-60, the ratio of a air flow from the upper air fan 16 to the lower air fan 17 is specified as 3:7 in S-61. And, the upper air fan 16 delivers the air flow of $Q_L \times 0.3$, while the lower air fan 17 delivers $Q_L \times 0.7$ in S-62, S-63.

Thereafter, the operation returns to the operation of S-40.

If the cooling operation is indicated in S-60, the ratio of the air flow from the upper air fan 16 to the lower air fan 17 is specified as 7:3 in S-64. As a result, the upper air fan 16 delivers the air flow of $Q_L \times 0.7$, while the lower air fan 17 delivering the air flow of $Q_L \times 0.3$ in S-66, S-67. Thereafter, the operation returns to S-40.

(2) When the set wind is "strong" in S-45:

In this case, the whole air flow Q is assumed to be $Q_M$ in S-50. When the heating operation is indicated in S-51, the ratio of the air flow from the upper air fan 16 to the lower air fan 17 is specified as 4:6 in S-52. As a result, the upper air fan 16 delivers the air flow of $Q_M \times 0.4$, while the lower air fan 17 delivers $Q_M \times 0.4$ in S-53, S-54. Thereafter, the operation returns to S-40.

While, when the cooling operation is indicated in S-56, the ratio of the air flow from the upper air fan 16 to the lower air fan 17 is specified as 6:4 in S-56. As a result, the upper air fan 16 delivers the air flow of $Q_M \times 0.6$, while the lower air fan 17 delivers the air flow of $Q_M \times 0.4$ in S-57, S-58. Thereafter, the operation returns to S-40.

(3) When the set wind velocity is "rapid" in S-45:

In this case, the whole air flow Q is assumed to be $Q_H$ in S-45. Whatever the indication of the operation is, the ratio of the air flow from the upper air fan 16 to the lower one 17 is specified as 5:5 in S-47. As a result, the upper air fan 16 delivers the air flow of $Q_H \times 0.5$, while the lower air fan 17 delivers the air flow of $Q_H \times 0.5$ in S-48, S-49. Thereafter, the operation returns to S-40.

According to the first embodiment, as described above, the upper air flow is controlled to be inversely proportional in the cooling operation but proportional in the heating operation to the whole air flow, thereby preventing.

In to FIGS. 3 to 8, the second embodiment of the present invention is illustrated. In which the like numerals designate the like or corresponding parts in FIG. 1. A tube temperature sensor (heat exchanger temperature sensor means) 26 senses the temperature of a heat exchanger 15 (hereinafter referred to as tube temperature Tb). A flow rate set switch 2 operates in the same way as in the first embodiment. A microprocessor 3 includes as in the first embodiment an input circuit 7, a CPU 8, a memory 9, and an output circuit 10, all those components operating in the same way as in the first embodiment, to control the rotary speeds of fan motors 19, 21 of the upper and lower air fans 16, 17 via a fan motor driver circuit 4. The microprocessor 3 and the fan motor driver circuit 4 are supplied as in the first embodiment with a stabilized power from an AC power source 5 by a DC power supply 6 which rectifies and stabilizes AC power from the AC power source.

Now, operation of the second embodiment will be described with reference to the flow charts of FIGS. 4 to 7.

First, in S-70, the user selects and sets the air flow at the "weak", "strong", and "rapid position" with the flow rate set switch 2. Then, in S-71, the microprocessor 3 reads the set flow rate. Successively, in S-72, the tube temperature sensor 26 outputs a sensed tube temperature Tb to the microprocessor 3.

(1) When the set air flow is "weak" in S-73:

In this case, the whole air flow Q from the upper and lower air fans 16, 17 (hereinafter referred to as the whole air flow.) is assumed to be $Q_L$ in S-75. In S-76, the microprocessor 3 compares a preset second set temperature $T_2$ with the tube temperature Tb sensed in S-72, and advances to S-77 if Tb is lower than $T_2$, while advancing to S-80 if Tb is equal to or higher than $T_2$. When advancing to S-77, the microprocessor 3 specifies the ratio of the air flow from the upper air fan 16 to that from the lower one 17 (hereinafter referred to as upper-to-lower air flow ratio) as 7:3. In S-78, S-79, the upper air fan 16 delivers the air flow of $Q_L \times 0.7$ while the lower air fan 17 the air flow of $Q_L \times 0.3$. Thereafter, the operation returns to S-72. When advancing to S-80, the microprocessor 3 specifies the upper-to lower air flow ratio as 3:7. And, in S-81, S-82, the upper air fan 16 delivers the air flow of $Q_L \times 0.3$, while the lower air fan 17 delivers the air flow of $Q_L \times 0.7$. Thereafter, the operation returns to S-72.

(2) When the air flow is "strong" (S-74):

In this case, in S-83, the microprocessor 3 compares the first set temperature T1 (T1<T2) with the tube temperature Tb read in S-72, and advances to S-84 if Tb is equal to or lower than T1. In S-84, the whole air flow Q is assumed to be $Q_L$. And, in S-85, the microprocessor 3 specifies the upper-to-lower air flow ratio as 7:3 as in S-77. In S-86, S-87, the upper air fan 16 delivers the air. flow of $Q_L \times 0.7$, while the lower air fan 17 delivers $Q_L \times 0.3$. And, the operation returns to S-72. If Tb is higher than T1 in S-83, the operation advances to S-88. The microprocessor 3 specifies in S-88 the whole air flow as $Q_M$. In the next step, S-89, the microprocessor 3 compares the tube temperature Tb with the second set temperature T2, and advances to S-90 if Tb is equal to or lower than T2 while advancing to S-90 if Tb is higher than T2. In S-90, the microprocessor 3 specifies the upper-to-lower air flow ratio as 6:4. In S-91, S-92, the upper air fan 16 delivers the air flow of $Q_M \times 0.6$, while the lower air fan 17 delivering the air flow of $Q_M \times 0.4$. The operation returns to S-72. In S-93, the microprocessor 3 specifies the upper-to-lower air flow ratio as 4:6. And, in S-94, S-95, the upper air fan 16 delivers the air flow of $Q_M \times 0.4$ while the lower air fan 17 delivers the air flow of $Q_M \times 0.6$. Finally, the operation returns to S-72.

(3) When the set flow rate is "rapid" in S-74:

In this case, in S-96, the microprocessor 3 compares in S-96 the preset first set temperature T1 with the tube temperature Tb read in S-72. And, it assumes in S-97 the whole air flow Q to be $Q_L$ unless Tb is higher than T1, and specifies in S-98 the upper-to-lower air flow ratio as 7:3. And, in S-99, S-100, the upper air fan 16 delivers the air flow of $Q_L \times 0.7$, while the lower air fan 17 delivers the air flow of $Q_L \times 0.3$. And, the operation returns to S-72.

If Tb is higher than T1, the microprocessor 3 judges in S-102 whether or not Tb reaches the second set temperature T2, and advances to S-101 unless Tb is higher than T2. In S-102, it assumes the whole air flow Q to be $Q_M$. In S-103, the microprocessor 3 specifies the upper-to lower air flow ratio as 6:4. And, in S-104, S-105, the upper air fan 16 delivers the air flow of $Q_M \times 0.6$, while the lower air fan 17 delivers the air flow of $Q_M \times 0.4$. Then, the operation returns to S-72. If Tb is higher than T2, the microprocessor 3 advances to S-106, and assumes the whole air flow Q to be $Q_H$, and specifies in S-107 the upper-to-lower air flow ratio as 5:5. In S-108, S-109, the upper air fan 16 delivers the air flow of $Q_H \times 0.5$, while the lower air fan 17 delivers the air flow of $Q_H \times 0.5$. Thereafter, the operation returns to S-72.

Figure 8:
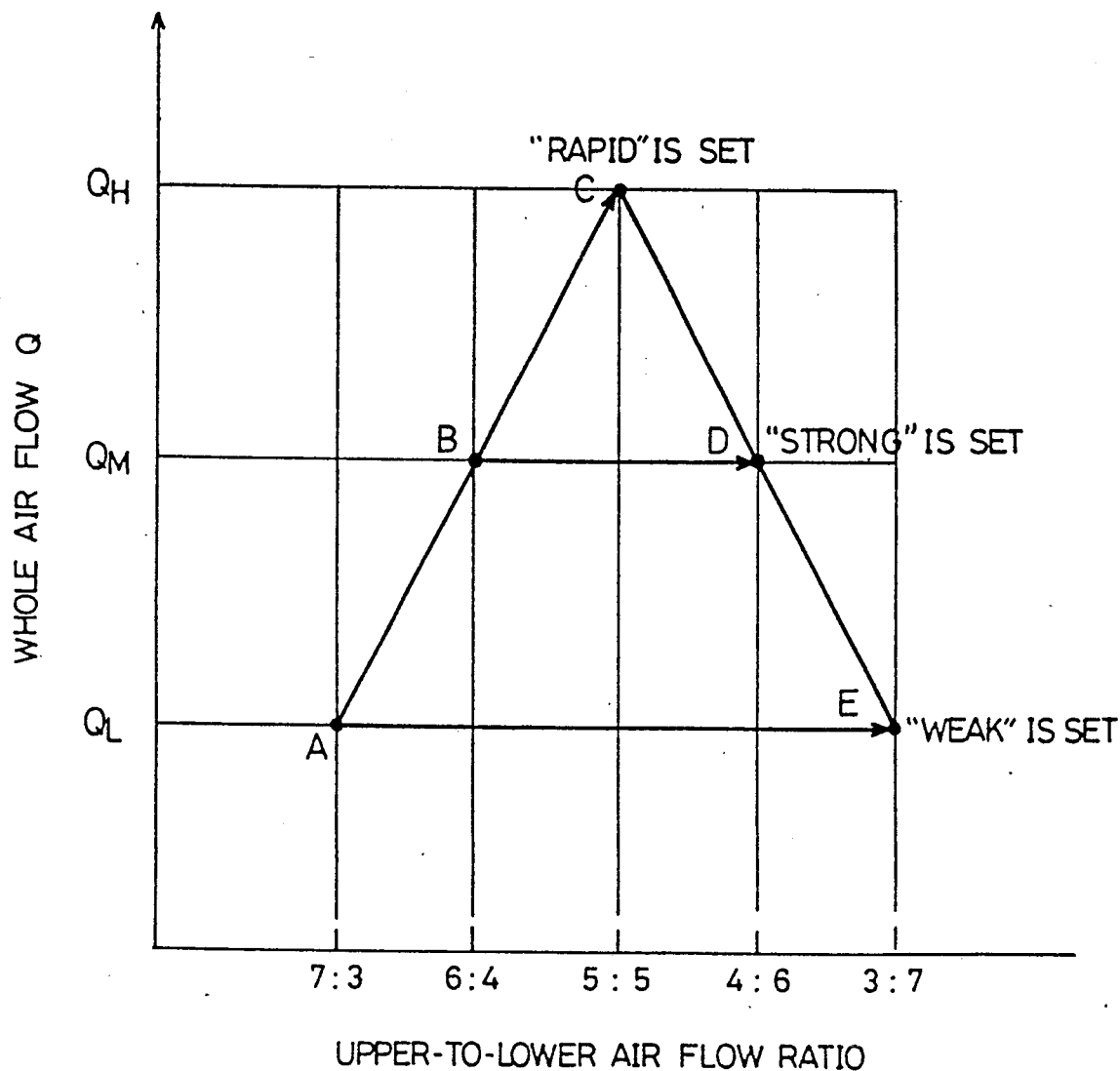
FIG. 8 is a diagram of the operation of the second embodiment illustrating the characteristics of outputs from the upper and lower air fans.

FIG. 8 here illustrates a relationship between the whole air flow and the upper-to-lower air flow ratio in the respective set flow rates when the heating operation is started as described above. As illustrated in the figure, the whole air flow Q and the upper-to-lower air flow ratio change as A→B→C when the rapid flow is set, A→B→D when the strong flow is set, and A→E when "the weak flow " set. The outputs of the upper and lower air fans 16, 17 are controlled in conformity with these processes.

According to the second embodiment of the present invention, as described above, the upper and lower air fans are controlled such that the ratio of the upper air flow to the whole air flow is reduced as the whole air flow is increased when the heating operation is started. The ratio is reduced as the whole air flow is reduced when the heating is stable. Hence, the second embodiment can prevent an uncomfortable draft when the heating operation being started and can assure in the stable heating condition a comfortable living space with a proper temperature distribution.

Figure 9:
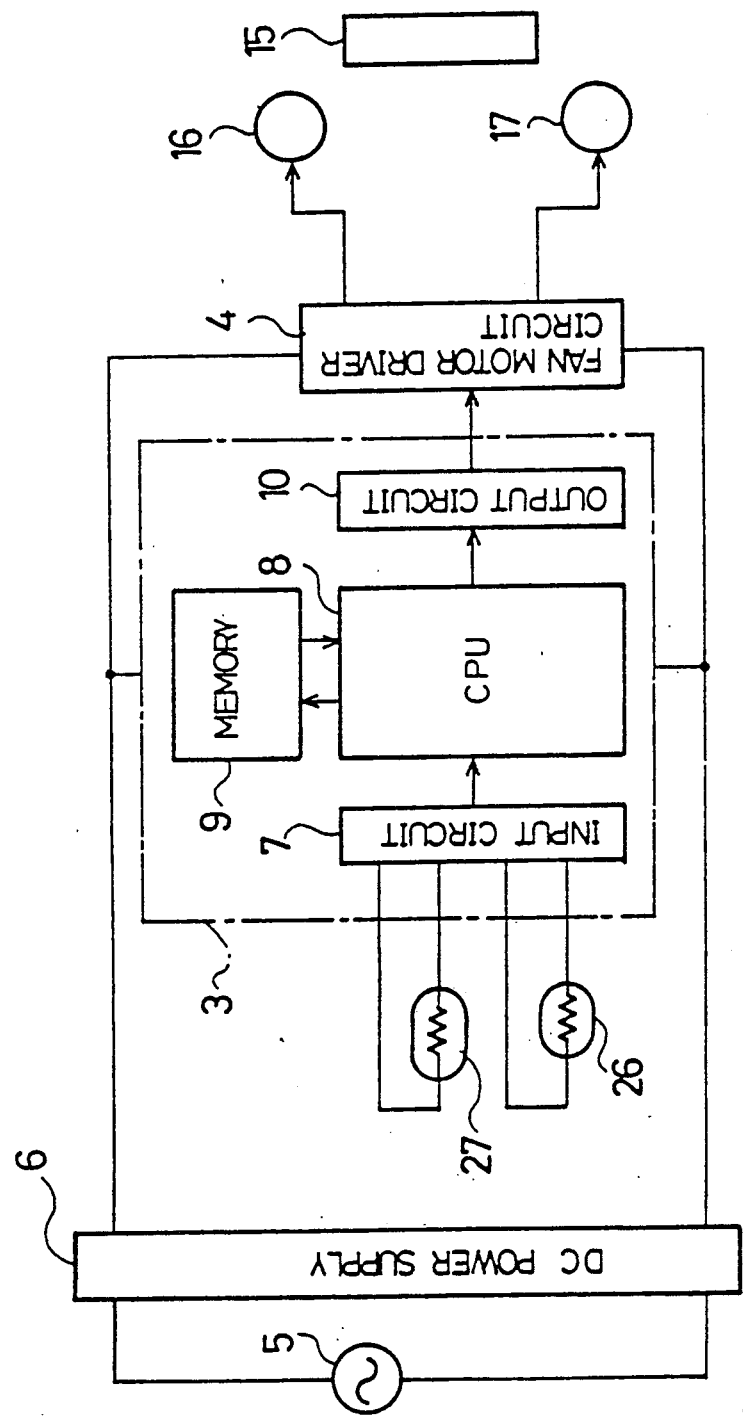
FIG. 9 is a block diagram showing the third embodiment of the present invention.

Referring now to FIGS. 9 and 10, the third embodiment of the present invention is illustrated. As shown in FIG. 10 in which like numerals designate the like or corresponding parts in FIGS. 1 and 3. A room temperature sensor 26 (room temperature sensor means) senses a typical room temperature, and a tube temperature sensor 27 (heat exchanger temperature sensor means) senses the temperature of a heat exchanger 15 (hereinafter referred to as tube temperature.). A microprocessor 3 (first and second air flow control means) includes as in the preceding embodiments an input circuit 7, a CPU 8, a memory 9, and an output circuit 10. The microprocessor 3 controls the rotary speeds of fan motors 19, 21 of upper and lower air fans 16, 17, and hence controls as described below the whole air flow from the upper and lower air fans 16, 17 and the upper air flow from the upper air fan 16 with respect to the whole air flow. That is, the microprocessor 3 (1) reduces the whole air flow as well as the upper air flow associated with that whole air flow when the room temperature Ta sensed by the room temperature sensor 26 is higher than a predetermined third temperature T3, and (2) increases the whole air flow as well as the upper air flow associated with the whole air flow when the sensed room temperature is lower than a predetermined fourth temperature T4 which is lower than the third temperature T3. Additionally, it (3), increases the whole air flow as well as the upper air flow associated with that whole air flow when the tube temperature sensed by the tube temperature sensor 2 is higher than predetermined first temperature T1, and (4) reduces the whole air flow as well as the upper air flow associated with that whole air flow when the sensed tube temperature is lower than the second temperature T2 which is lower than the first temperature T1.

The microprocessor 3 and the fan motor driver circuit 4 are supplied as in the preceding embodiments with a stabilized power supply from an AC power from the AC power source.

Figure 10A:
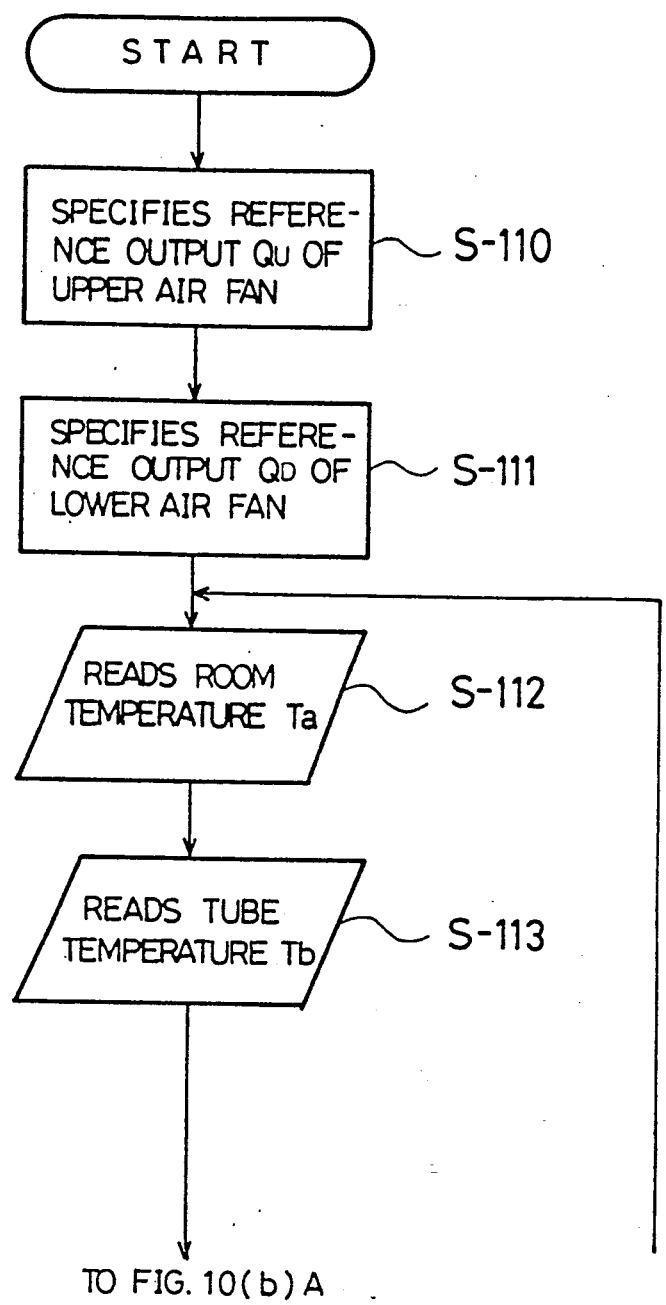
FIGS. 10a and 10b are is a flow chart illustrating the operation of the third embodiment.
Figure 10B:
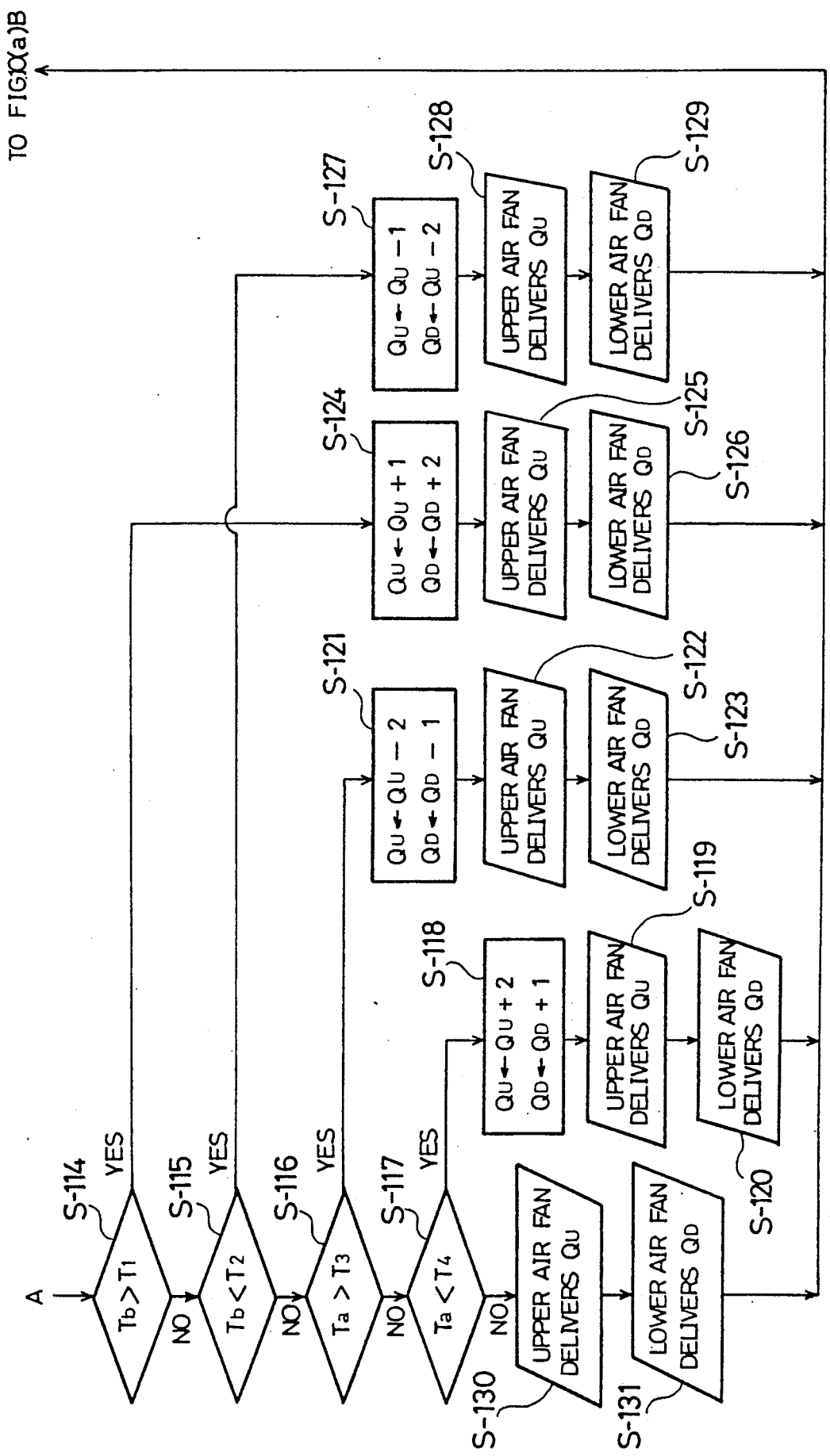

Operation of the third embodiment will be described with reference to the flow chart of FIG. 10a and 10b.

First, the reference value $Q_{US}$ of an output $Q_U$ from the upper air fan 16 and a reference $Q_{DS}$ of an output $Q_D$ from the lower air fan 17 are specified in S-110, S-111. The CPU 8 reads the typical temperature Ta sensed by the room temperature sensor 1 and the tube temperature Ta sensed by the tube temperature sensor 2 via the input circuit 7 in S-112, S-113. In S-114, the CPU 8 then compares the read tube temperature Tb with the predetermined first set temperature T1. In S-124, the CPU 8 increases the output $Q_U$ of the upper air fan 16 by one step as well as the output QD of the lower air fan 17 by two steps when the tube temperature Tb is higher than the first set temperature. As a result, the whole air flow is increased, while the upper air flow associated with that whole air flow is reduced. In succession, the upper air fan 16 delivers the predetermined out-put $Q_U$, while the lower air fan 17 delivers the predetermined output $Q_D$ in S-125, S-126. Thereafter, the operation returns to S-112. If the tube temperature Tb is not higher than the first set temperature T1 in S-114, the microprocessor 3 compares the tube temperature Tb with the predetermined set temperature T2 in S-115. As a result, when the tube temperature Tb is lower than the predetermined set temperature T2, the microprocessor 3 increases the output $Q_U$ of the upper air fan 16 by one step, while decreases the output $Q_D$ of the lower air fan 17 by two steps in S-127. As a result, the whole air flow is reduced, while the upper air flow associated with the whole air flow is increased. Successively, the upper air fan 16 delivers the predetermined output $Q_U$, while the lower air fan 17 delivers the predetermined output $Q_D$. Thereafter, the operation returns to S-112.

On the contrary, when the tube temperature Tb is not lower than the predetermined second set temperature T2, the microprocessor 3 compares the read room temperature Ta with the predetermined third set temperature T3 in S-116. As a result, when the room temperature Ta is higher than the predetermined third set temperature T3, the microprocessor 3 reduces the output $Q_U$ of the upper air fan 16 by two steps, and the output $Q_U$ of the lower air fan 17 by one step in S-121. Consequently, the whole air flow is reduced, and the upper air flow associated with that whole air flow is reduced. Successively, the upper air fan 16 delivers the predetermined output $Q_U$, while the lower air fan 17 delivering the predetermined output $Q_D$ in S-122, S-123. Thereafter, the operation returns to S-112. Contrarily, when the room temperature Ta is not higher than the predetermined third temperature T3, the microprocessor 3 compares the room temperature Ta with a predetermined fourth set temperature T4. As a result, when the room temperature Ta is lower than the predetermined fourth set temperature T4, the microprocessor 3 increases the output of the upper air fan 16 by two steps, and the output of the lower air fan 17 by one step in S-118. Consequently, the whole air flow is increased, as the upper air flow associated with the whole air flow is increased.

In succession, the upper air fan 16 delivers the predetermined output $Q_U$ in S-119, while the lower air fan 17 delivers the predetermined output $Q_D$ in S-120. Thereafter, the operation returns to S-112. On the contrary, when the room temperature Ta is not lower than the predetermined fourth set temperature T4, the upper air fan is delivers the predetermined output $Q_U$ in S-130, while the lower air fan 17 delivers the predeyermined output $Q_D$ in S-131.

According to the third embodiment, as described above, it is possible to not only eliminate an uncomfortable draft but also direct plenty of hot air to persons' feet.

According to the present invention, air flow control means for controlling air flows blown out from the upper and lower air fans. The air flow control means controls the upper and lower air fans such that an upper air flow from the upper air fan is inversely proportional to the whole air flow from the upper and lower air fans in the cooling operation, while the upper air flow is proportional to the whole air flow in the heating operation. The air flow control means further controls upon the heating operation the upper and lower air fans so as to reduce the a ratio of the upper air flow to the whole air flow as the whole air flow from the upper and lower air fans increases. The air flow control means still further controls in stable heating operation the upper and lower air fans so as to reduce the ratio of the upper air flow to the whole air flow as the whole air flow decreases. The separate air conditioner of the present invention can therefore prevent the occurrence of an uncomfortable draft in the cooling and heating operations. The separate air conditioner can further be operated without producing an uncomfortable draft for thereby assuring a comfortable living space which has a proper temperature distribution in the stable heating operation as well as directing plenty of warm air to the foot area when the whole air flow being is reduced.

Although certain preferred embodiments have been shown and described, it should be understood that many changes and modifications may be made without departing from the scope spirit of and the invention recited in the appended claims.

What is claimed is:

1. A separate air conditioner comprising:
   a unit casing which is to be put in a room and has an upper outlet, a central inlet, and a lower outlet on a front wall thereof;
   a heat exchanger opposed to said central inlet;
   an upper fan opposed to said upper outlet for taking air from said room through said heat exchanger and blowing it out through said upper outlet;
   a lower fan opposed to said lower outlet for taking air from said room through said heat exchanger and blowing it out through said lower outlet;
   first air flow control means for controlling said upper and lower fans in an initial heating period prior to said heat exchanger reaching a predetermined temperature such that a ratio of an upper air flow from said upper fan to a total air flow from both said upper and lower fans decreases as said total air flow increases; and
   second air flow control means for controlling said upper and lower fans in a stable heating state after said heat exchanger has reached said predetermined temperature such that said ratio decreases as said total air flow decreases.

2. The separate air conditioner of claim 1, wherein further air flow control means controls said upper and lower fans in a cooling operation such that an upper air flow from said upper fan is inversely proportional to a total air flow from both said upper and lower fans, while said further air flow control means controls said upper and lower fans in a heating operation such that said upper air flow is proportional to said total air flow.

* * * * *